United States Patent [19]
Weingartner et al.

[11] Patent Number: 5,283,918
[45] Date of Patent: Feb. 8, 1994

[54] VEHICLE SEAT CUSHION

[75] Inventors: Rudolf Weingartner, Neuhofen a.d. Krems; Johann Möseneder, Grieskirchen, both of Austria

[73] Assignee: C. A. Greiner & Sohne, Kremsmunster, Austria

[21] Appl. No.: 870,959

[22] Filed: Apr. 20, 1992

[30] Foreign Application Priority Data

Apr. 22, 1991 [AT] Austria .................................. 832/91
Oct. 11, 1991 [AT] Austria ................................. 2031/91

[51] Int. Cl.⁵ .......................................... A47C 7/02
[52] U.S. Cl. ................................................ 5/481; 5/459; 5/470; 297/452.21; 297/452.27; 297/452.53; 297/DIG. 6; 297/DIG. 7; 297/281
[58] Field of Search .................. 5/459, 481, 483, 470, 5/653; 297/DIG. 1, DIG. 5, 452, 459, 458, DIG. 6, DIG. 2, 218

[56] References Cited

U.S. PATENT DOCUMENTS

| | | | |
|---|---|---|---|
| 3,000,020 | 9/1961 | Lombard | 5/481 |
| 3,762,766 | 10/1973 | Barecki et al. | |
| 4,060,280 | 11/1977 | Van Loo | 5/459 |
| 4,067,209 | 1/1978 | Kucera | 297/DIG. 5 |
| 4,317,244 | 3/1982 | Balfour-Richie | 5/470 |
| 4,463,465 | 8/1984 | Parker et al. | |
| 4,475,768 | 10/1984 | Webb | 5/470 |
| 4,682,818 | 7/1987 | Morell | 297/452 |
| 4,726,624 | 2/1988 | Jay | 297/452 |
| 4,840,430 | 6/1989 | Shimada | 297/DIG. 1 |
| 4,923,729 | 5/1990 | Porter | 5/459 |
| 4,955,095 | 9/1990 | Gerrick | 5/470 |
| 4,958,394 | 9/1990 | Urai | 5/481 |
| 5,053,271 | 10/1991 | Mori | 428/316.6 |
| 5,085,487 | 2/1992 | Weingartner | 5/459 |

FOREIGN PATENT DOCUMENTS

| | | | |
|---|---|---|---|
| WO87/06894 | 11/1987 | Austria . | |
| 0190064 | 8/1986 | European Pat. Off. . | |
| 2910160 | 9/1980 | Fed. Rep. of Germany . | |
| 2921740 | 12/1980 | Fed. Rep. of Germany ... | 297/DIG. 1 |
| 8506816 | 9/1985 | Fed. Rep. of Germany . | |
| 37102 | 7/1935 | Netherlands | 5/470 |
| 2067896 | 8/1981 | United Kingdom . | |
| 88/09731 | 12/1988 | World Int. Prop. O. . | |

Primary Examiner—Peter M. Cuomo
Assistant Examiner—Flemming Saether
Attorney, Agent, or Firm—Kurt Kelman

[57] ABSTRACT

A seat cushion is disclosed, in particular for an aircraft seat, with a supporting body of a foamed plastic with a spring core embedded therein, and a flameproofing layer of flame-retardant plastics foam, to which a covering material is secured, preferably detachably. The supporting body is formed from a lower supporting part of foamed plastic having the spring core embedded therein and a sitting part, also of foamed plastic, preferably of a different density.

22 Claims, 10 Drawing Sheets

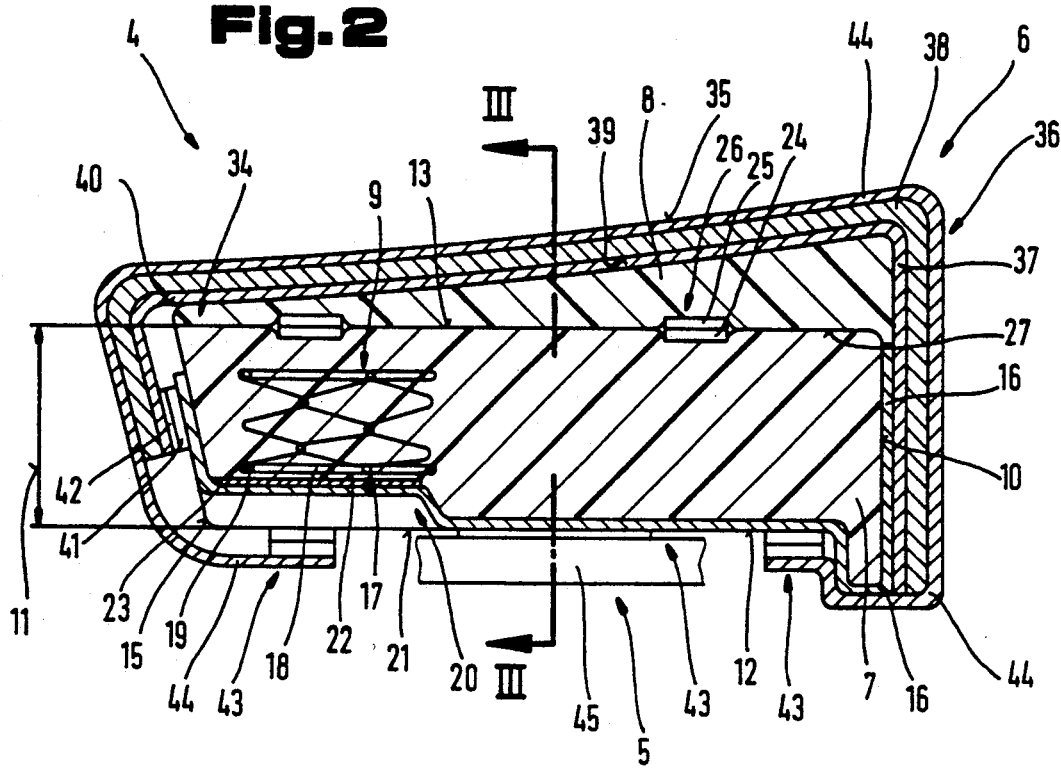
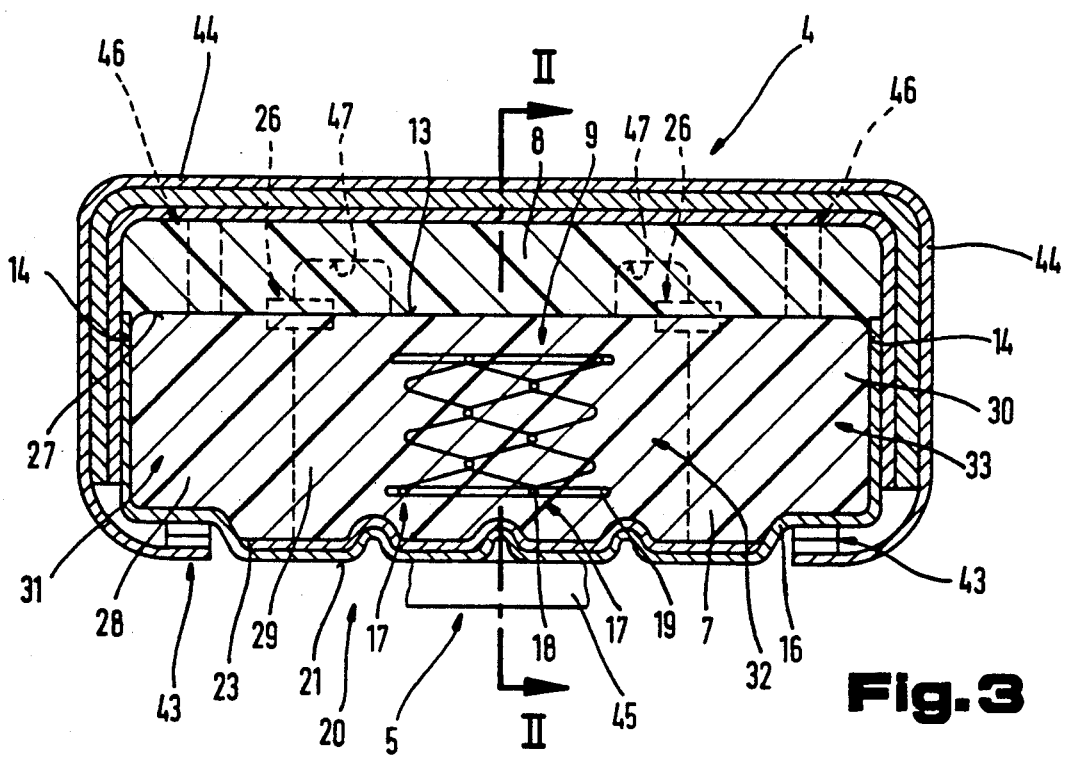

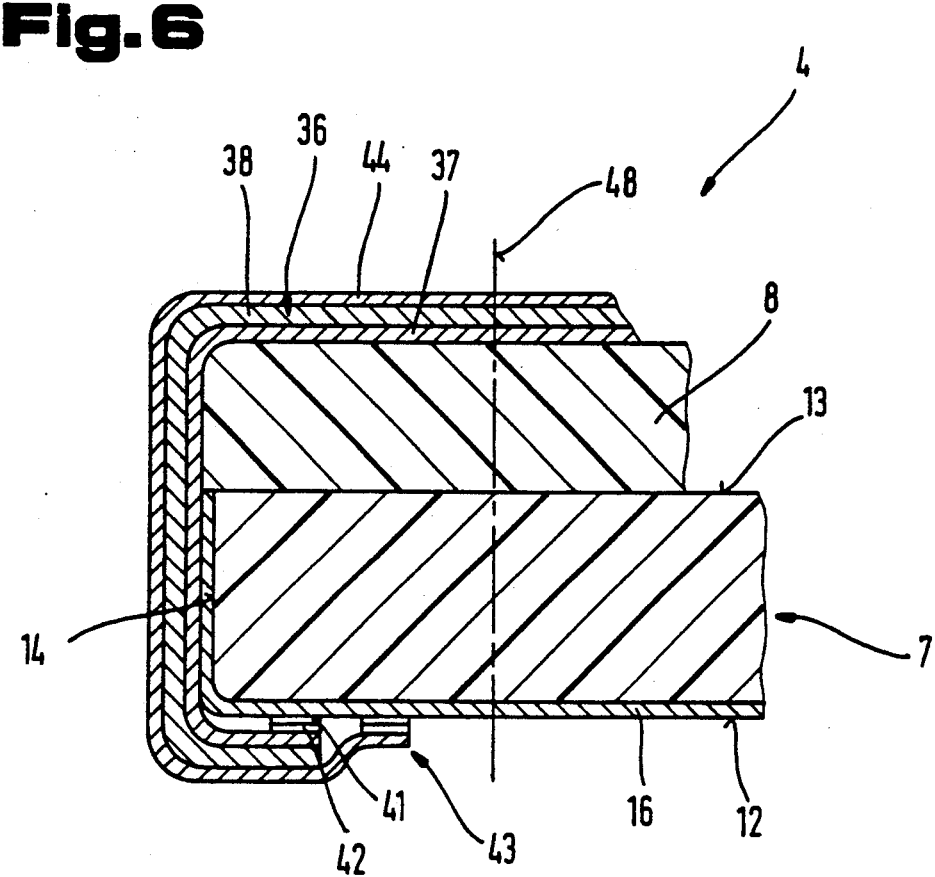
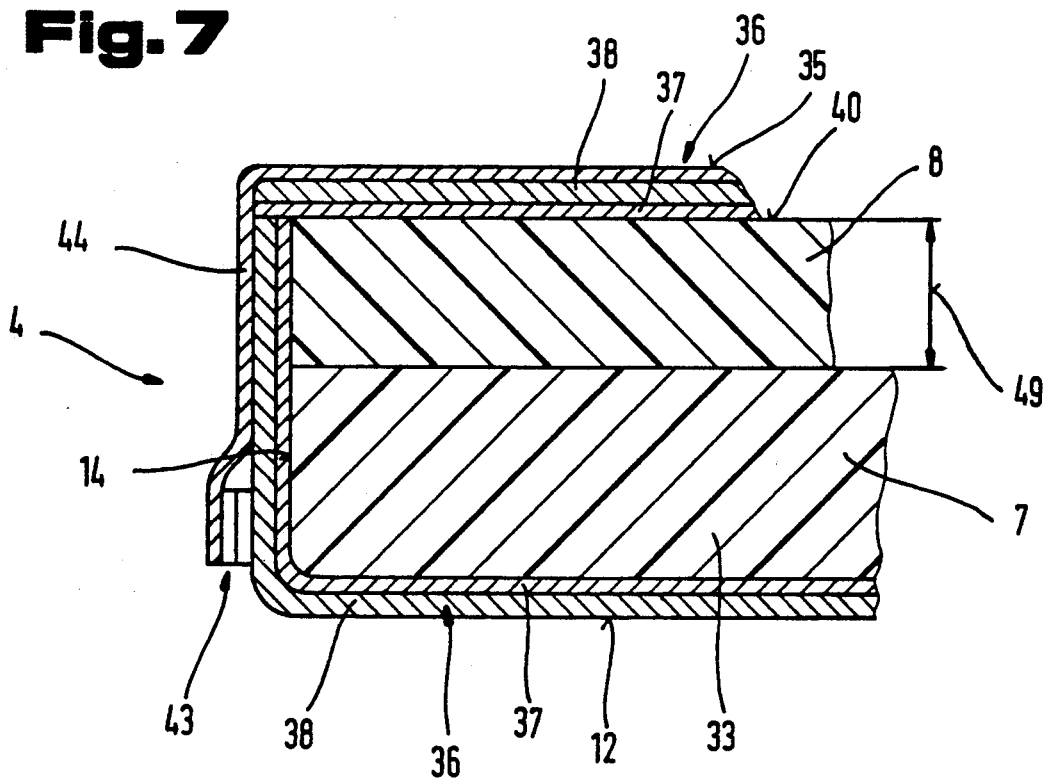

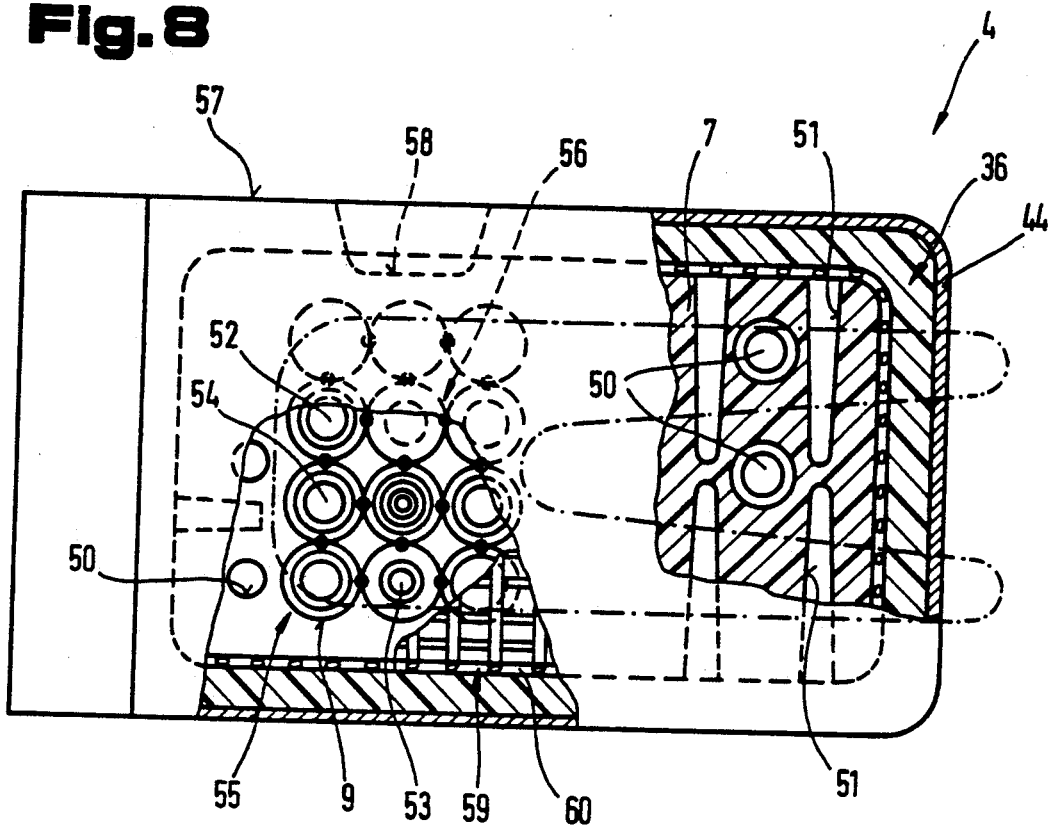
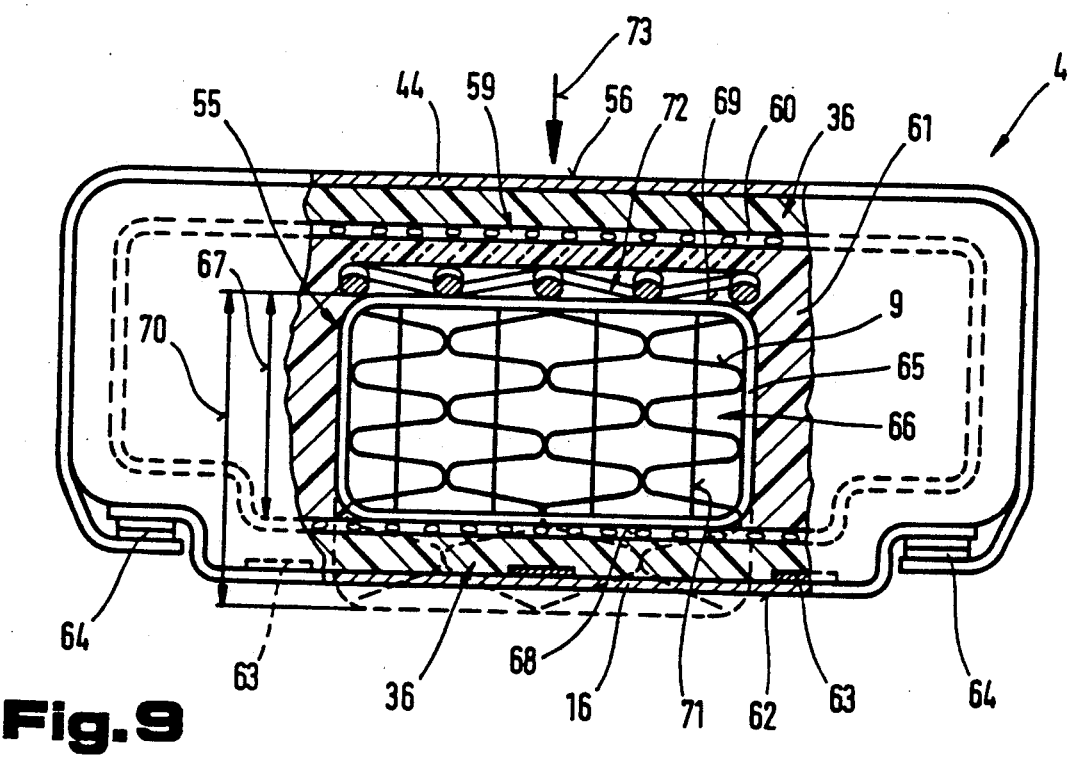

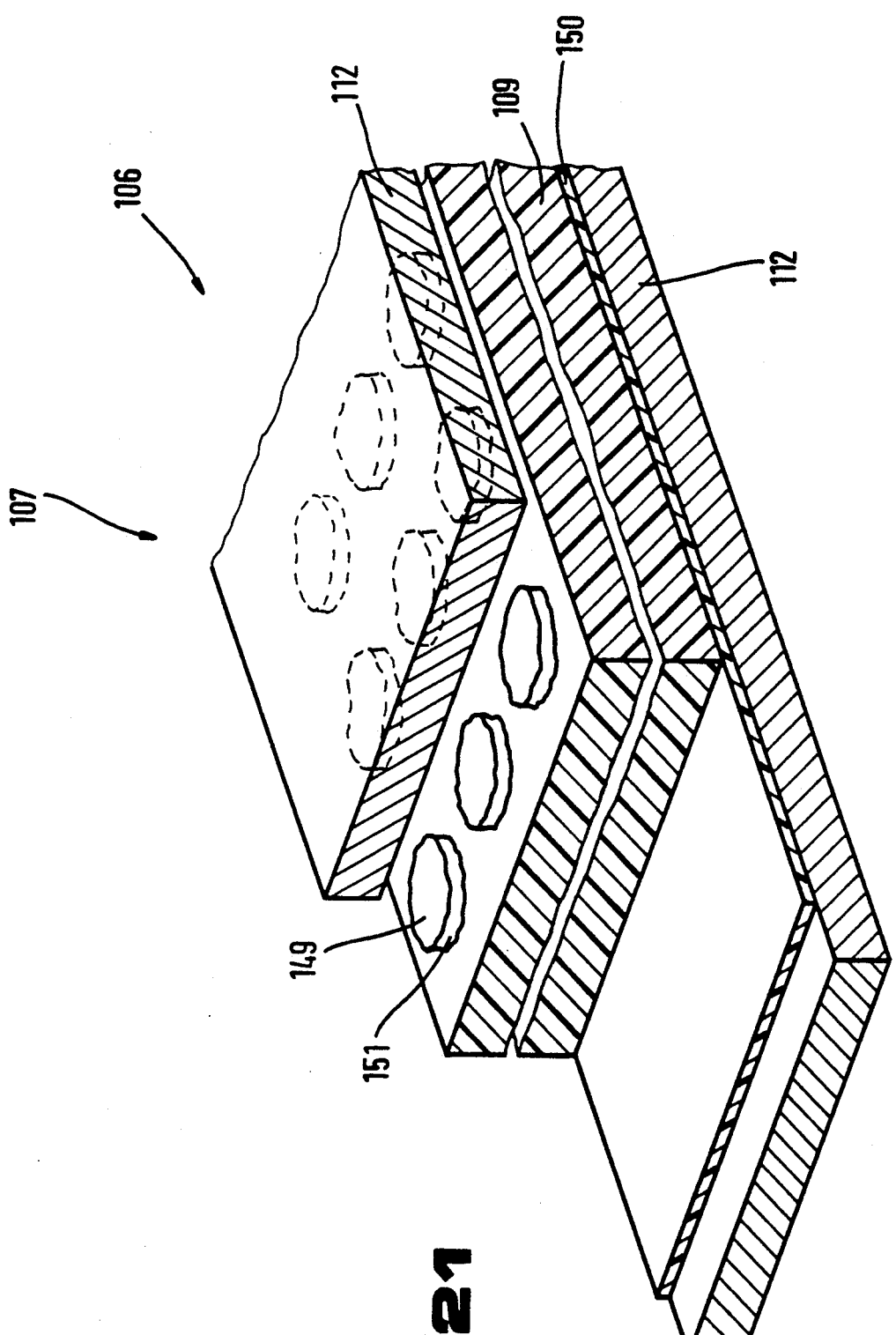

VEHICLE SEAT CUSHION

BACKGROUND OF THE INVENTION

1. Field of the Invention

The invention relates to a seat cushion, in particular for an aircraft seat, of the type comprising a supporting body of a framed plastic having a spring core embedded therein and a flameproofing layer of flame-retardant plastic foam to which a covering material is connected, preferably detachably.

2. Description of the Prior Art

A known seat with a cushion of foamed plastic described for example in published PCT application WO-87/06894 application of C. A. Greiner & Söhne GmbH—comprises a foamed plastic with a support body of an open-celled, resilient plastic foam having a first density and a flameproof layer of an open-celled resilient foamed plastic, provided with a flameproofing agent, having a second density which is different from said first density. The plastic foam and the flameproof layer are connected with each other, in particular through a foaming process, and are surrounded by a flame-resistant covering material. in order to achieve a sufficient permeability to air on the part of such a cushion, it has also been proposed, after the completion of the cushion, to push heated needles through, so that a corresponding exchange of air is possible. These cushions have proved to be very successful in practice;-however, it has been found that, especially in extreme weather conditions, or under various climatic conditions, the sitting comfort of the seats for the planned usage in vehicles was not sufficient.

In addition, seats for public transport are also known—as disclosed in German Utility model 85 06 816—which have a seat cushion, which is covered with a seat cover, in which the seat cover and the seat cushion consist of a flame-resistant and low-smoking material. Between the flame-resistant seat cover and the seat cushion, mostly consisting of plastic foam, there is often arranged a glass fibre mat which is intended to prevent the seat cover from burning through in the direction of the seat cushion. However, it has been found here that in many cases, the action of the flames arises from the direction of the floor and the plastic foam of the seat cushion tends to burn, with an intensive generation of smoke, whereby in the case of fire, the vehicle is so full of smoke in the shortest period of time that it is scarcely possible for the occupants to find their bearings. Accordingly, in the case of this known seat, provision is made that beneath the seat cushion in the supporting frame of the seat, a fire-resistant plate is arranged. This requires the use of a special section for mounting the seat padding and also requires an additional expenditure through the arrangement of the fire-resistant plate. In this embodiment, the ventilation of the seat was not satisfactory, either.

Seats with cushions of foam plastic are very widely used in modern vehicle construction. They are used above all in rail and road vehicles, but also to a predominant extent in aircraft. Whilst the regulations applicable to rail vehicles with regard to the self-extinguishing construction of the materials which are used, or respectively the generation of smoke, prescribe very strict guiding principles, the regulations applicable in the aircraft industry are even more stringent. Thus, a test is prescribed in the case of seats permitted for use in aircraft, in which the cushions, in their composition as provided for installation, are directly exposed to a flame from a burner. This flame acts over a period of 2 minutes directly onto the cushion, after which the flame is extinguished or removed. The cushion is extinguished after 5 minutes, if the flames have not extinguished themselves by that time. After this fire test, the weight loss of the cushion must not be higher than 10%. In order to fulfill these extremely strict regulations, and at the same time also achieve a high degree of sitting comfort in the seats in the case of flights of long duration and to achieve a low weight, seat cushions of various open-celled, elastic soft foam plastics, provided with flameproofing agent and having differing densities, are stuck together.

Such a known vehicle seat—as described in European specification A1 190 064—comprises several layers of needle fleece, which are surrounded by a flameproof covering material. Between the covering material and the individual layers of needle fleece, to reduce damage by vandals, reinforcement mats of metal or glass fibres are arranged. Through the sticking of the individual layers and the many intermediate layers of this vandal-proof layer, sufficient ventilation is still difficult to achieve in the known vehicle seat.

In another known seat for aircraft, in order to produce the complicated three-dimensional fashioning of the seat cushions more simply, the supporting body is formed from a part which is foamed in one piece in a mould and is mixed with flameproofing agents, the surface of which is covered with a flameproofing layer and thereafter with a flameproof covering material. With the known seats, however, the new increased safety specifications and testing regulations for aircraft seats could not be fulfilled.

SUMMARY OF THE INVENTION

It is an object of the present invention to provide a seat cushion which deals with the extraordinary stresses of seat cushions, in particular in public transport, especially aircraft seats, and with a long durability to facilitate maintenance, in particular keeping such seat cushions clean. It is a further object of the invention to provide a seat cushion which is comfortable to sit on even over a lengthy period of use. It is a still further object of the invention to provide a seat cushion which exhibits a high resistance to fire and also a long duration of use without destroying the material protective layer.

These objects are achieved in accordance with the invention in that, in a seat cushion of the aforementioned type the supporting body is formed from a supporting portion of a foamed plastic, having the spring core embedded therein, and a sitting portion, also of foamed plastic, the flameproofing layer being connected to the sitting portion. It is an advantage of the seat cushion in accordance with the invention that the components of the cushion having a long durability, and those areas which are hardly exposed to soiling or affected in terms of hygiene by the user, can be separated simply from those parts which are affected the most by the bodily perspiration of the user and, in the case of a fire, by high temperatures. Thereby it is possible to separate the sitting part, when it has become soiled or uncomfortable, independently of the part of the seat cushion having the majority of the structural parts. Hence, the cost of such seat cushions can be reduced considerably over the working life of an aircraft or other vehicle, and it is possible, moreover, to adhere to stringent requirements with regard to the cleanlines and hygiene of the areas of the seat cushion in contact with the user. In addition to this it is now possible, for various categories of seat cushion for example to use the same basic components for business class or economy class, which can be equipped with different sitting parts in terms of quality and hence also in terms of price. Furthermore, it is now also possible to take into account the specific factors in the use of such aircraft, for example in short distances or in long-haul flights, because then seats can be used which have differing qualities with regard to climate, e.g. a better ventilation in long-haul flights or respectively a greater hardness, in order to offer greater resistance to wear.

In a preferred embodiment of the invention the flameproofing layer projects over the sitting part in the direction of the supporting part and overlaps at least the lateral edges of the latter. Problem-free positioning of the sitting part on the supporting part is thus achieved and hence a re-equipping of the seats for the purpose of renewing the sitting part or respectively for fitting with sitting parts having a different property, especially also in connection with cleaning work, can be carried out rapidly and at a favourable cost. Furthermore, it is thereby possible to provide only one of the two parts of the supporting body with a flameproof layer of an elastic plastic foam since, through the construction of this layer, overlapping the supporting part, in the areas of the supporting part which are affected most intensively by a fire, a sufficient protection from fire is achieved.

In an advantageous further development of the invention connecting devices such as burred closures are arranged between the flameproofing layer and/or the sitting portion and the supporting part, in the region of mutually opposed bearing faces thereof and/or in the overlapping region of the flameproofing layer. This provides an effective, rapidly detachable arrangement, requiring a low weight, for connecting the supporting part with the sitting part. Also a tight seal can be created between the flameproof layer and the sitting part or supporting part, so that the penetration of the flames between the flameproof layer and the supporting part or sitting part is reliably prevented.

To facilitate an exchange of the covering material the supporting part preferably carries connecting means such as a burred tape for securing the covering material.

The supporting part of the seat, adjacent its bearing surface in contact with the sitting portion, is preferably covered with a flame-retardant covering material which may be secured in position by adhesive. This provides a very stable structural element which can be manufactured in quantity with a high standard of quality, and which meets the high requirements in aviation technology, and moreover is very simple to handle on assembly.

The arrangement, between the sitting and supporting parts of the cushion, of an intermediate layer consisting of high temperature resistant fibres and threads, facilitates control of the spread of fire since through this intermediate layer, which is arranged close to the surface, the majority of the material matter is encased and thereby in the case of a fire only a relatively small volume, which furthermore consists of flame-resistant material, is present and therefore as a whole the fire behaviour, and also the further spread of the fire, by dropping off a greater quantity of the volume is prevented. Such an intermediate layer can also be provided between the flameproofing layer and the flame-retardant covering material.

It is advantageous if the fibres or threads of the intermediate layer comprise carbon, metal, aramid fibres such as Kevlar ®, polytetrafluoroethylene (PTFE) or other high-temperature resistant plastics, because with these materials in the case of fire, a barrier layer is created, partially through a carbonisation but also as a whole through the inherent properties of these materials.

The spring core is preferably foamed into the supporting part, more preferably in the rear half of this portion and spaced from one edge thereof, so that the area of the seat cushion which is exposed to the heaviest load, in particular a load which alters greatly, is effectively protected from premature wear and destruction and, furthermore zones are achieved, having differences in their elasticity, distributed over the seat surface, which in addition to increasing the endurance strength, also serve to increase the sitting comfort.

The spring core preferably has, in its unstressed state, a height greater than the thickness of the supporting part, and is prestressed to accommodate it within the supporting part, so that in accordance with the load characteristics for springs, already in the case of small spring wire thicknesses, and hence with a low weight of the spring core, a corresponding spring action is achieved.

To provide the required resilient support of the spring core in the supporting part and protection of the covering material surrounding the supporting part or sitting part the spring core preferably has bearing surfaces which are spaced from the upper and/or lower surfaces of the supporting part.

In order to avoid direct bearing of metal parts of the spring core on the supporting frame for the seat cushion and ensure a longer service life is achieved for the outer covering materials, recessed grooves are preferably arranged in the underside of the supporting part in the region of node points of longitudinal and transverse wires of the spring core in the direction of the bearing surface of the supporting part, and projections extending over the groove base are spaced approximately by the extent of a groove depth, in the direction of the underside of the cushion from the bearing surface of the spring core.

In a preferred embodiment, openings, cavities or perforations are provided in the sitting part, running vertically to the bearing surfaces, to bring about a differentiation in the strength- and resilience in the form of weakening cross-sections to match the qualities directly in the zones adjacent to the surface. In addition, through the arrangement of these perforations, a better ventilation of the sitting part is achieved for the removal of moisture, as may occur in climatic changes.

Preferably the weakening cross-sections or respectively ventilation openings are arranged in a region of the least stress of the sitting part, i.e. in the region of lateral edges, running vertically to the end edges.

The flameproofing layer and/or the intermediate layer preferably overlap the underside of the supporting part to envelop its lower lateral edges.

The covering material and/or the flameproofing layer of the supporting part preferably overlap the opposed bearing surfaces of the supporting and sitting parts, whereby a substantially plate-shaped composite body of the foamed plastic and of a coating is achieved, the manufacture of which is possible in large quantities, and which therefore makes possible an exchangeable part which is very favourable in terms of cost for the continuous maintenance of the seats.

The supporting and sitting parts of the cushion are preferably of open-celled foamed plastic, that of the supporting part having a higher density than that of the sitting part, to impart strength to the supporting part and prolong its useful life.

The supporting part and/or sitting parts are preferably divided into regions of differing density so as to optimise the weight of these components in relation to the zones having a differing load.

The flameproofing layer is preferably also of resilient and/or open-celled foamed plastic, having a density corresponding to that of the sitting and/or supporting part. A higher degree of sitting comfort can be achieved if this material has a low density which immediately adjoins the surface.

Surface regions of the supporting part, adjacent to the bearing surface which abuts the sitting part, are preferably coated with the flameproofing and/or intermediate layer so as to enhance protection of the supporting part in the case of fire and as a whole of the seat padding on the underside facing the cabin floor.

The plastic foam of the supporting part is preferably foamed onto the covering material or onto a fluid-tight intermediate layer connected thereto, for example a plastics, preferably polyethylene, film stuck or sealed onto the covering material. The manufacturing costs and the material weight for the manufacture of the supporting part can thus be reduced by eliminating an additional adhesive layer between the covering material and the plastic foam.

The invention also provides a seat cushion, in particular for a vehicle, with a supporting body of an open-celled, resilient plastics foam and with a flame-resistant material protective layer surrounding the latter, which are connected with each other, preferably by being stuck in places, and with a flame-resistant covering material, encasing at least partial regions of the seat cushion which covering material is connected in particular via a detachable connecting device with the supporting body and/or the material protective layer as defined above, wherein the material protective layer comprises a machine-knitted, multi-layered material, the warp threads of which are arranged so as to be staggered with respect to each other in at least two planes in the woof direction and that the warp threads in each plane are looped around in each case by three weft threads of a weft thread group of eight weft threads and wherein in each case two weft threads loop around each warp thread of the upper plane and one of these loops around the warp threads of the lower plane, in each case spaced apart by a double spacing and the other of these two weft threads loops around the warp threads of the lower plane, lying therebetween and likewise spaced apart by a double spacing. The surprising advantage of this solution, which appears to be relatively simple, lies in that with the utilisation of the inherent elasticity of the supporting body, comprising a foamed plastic, in combination with the specifically constructed material and its high elasticity, a high restoring capability is achieved in the case of stresses occurring through the action of forces or acting on the seat cushion. At the same time, this prestressing existing through the foam material of the supporting body keeps taut the material protective layer, which in itself is elastic, and in connection with the processing, avoids the creasing which otherwise usually occurs in such material protective layers. Through the fact that this creasing can be eliminated, it is, however, now possible in turn to use in such covering materials high-strength fibres, which are sensitive to breaking in the case of creasing, such as for example polyamide fibres and preoxidised polyacrylonitrile fibres. On the other hand, however, folds are also prevented from remaining in the material protective layer through overstretching of the material protective layer at a point, because through sticking the material protective layer with the supporting body as far as possible over the whole surface or over a large part of the surface, the maximum expansions between the individual attachment sites in the sense of adhesion sites are kept small and consequently such excess stresses are likewise reliably avoided. A further advantage of the material protective layer used lies in the high density and in the high cutting resistance owing to the arrangement of the warp threads in several layers in at least two planes lying one over the other. Thereby, both a high mechanical resistance strength and also a high flame resistance or favourable burning properties are achieved.

In a preferred version of this embodiment, a first weft thread loops around each warp thread of the upper plane, a second weft thread adjacent thereto, in the longitudinal direction of the warp thread, loops around the warp threads not looped around by the first weft thread in the lower plane, a third weft thread, adjacent thereto, only loops around the warp threads looped around by the first weft thread of the lower plane and a fourth weft thread loops around the warp threads in the upper plane, in each case spaced apart from each other by a double spacing, and a further four weft threads with a similar looping path are associated with the warp threads, in each case staggered by a spacing, in the lower or upper plane, in which the warp threads of the upper plane are staggered by a half spacing in the woof direction with respect to the warp threads in the lower plane. The required elasticity in the material protective layer can thus be achieved in that a quite rigidly interlinked layer of warp and weft threads is connected via parts of these weft threads, which are displaceable three-dimensionally, with a material layer of warp and weft threads, having a higher elasticity, in the lower plane, so that despite a high wear resistance in the upper layer, sufficient elasticity with respect to the supporting body is achieved and hence also tearing of the foam plastic out of the supporting body can be prevented through a uniform distribution of the stresses which are introduced.

The weft threads which loop around the warp threads of the individual planes preferably run between the warp threads arranged between the two planes to give a smooth knitted pattern, which prevents individual weft threads with a lower prestressing from protruding above the surface of the material and hence catching or hanging on the seat surface. Thereby the weft threads can be prevented from being torn off or worn more intensively, whereby the wear resistance and the durability of such a seat cushion is further increased.

Preferably, in the upper side of the material protective layer, facing the support body or the adhesive, the warp threads are only looped around alternately by one of the two weft threads of the group connecting together the warp threads of the two planes. This achieves a distribution of concentrated loads acting on the material protective layer over a greater area, whereby the overall loading of the supporting body is reduced in closely delimited areas.

At least some individual warp and/or weft threads are preferably made of polyamide fibres, preferably of 1/56 metregauge, offering a considerable increase in strength, without impairing the seat or its comfort during use, or the durability of the seat cushion.

The warp and/or weft threads are preferably provided with a coating of synthetic material, such as polyvinylchloride (PVC) or polyurethane (PU) so as to render the protective layer dirt-repellent, as is important in particular when used in long-haul aircraft wherein seats are much affected by bodily perspiration and bodily secretions.

An extremely resistant development of the seat cushion is achieved if at least a portion of the warp and weft threads comprise preoxidised polyacrylonitrile and another portion thereof comprise polyamide, the content of polyamide fibres being preferably 30% and the content of preoxidised polyacrylonitrile fibres 70%. The advantage is that such fibres have a high temperature resistance with a low gas emission and at the same time combine this advantage with the advantage of a high tensile elasticity, so that such a material protective layer not only has a protective wall against temperature influences but also at the same time against mechanical damage and stresses.

The warp and/or weft threads preferably have a slight twist so that the elasticity of the individual threads from which the material protective layer is produced is higher and consequently damping properties are achieved.

The warp and/or weft threads are preferably prestressed and fixed thus by means of adhesive in the supporting body. In this way, slack portions and excessive stretching in individual regions of the material protective layer can be prevented.

In another preferred embodiment, the supporting body is foamed onto the surface of an associated material protective layer facing away from a surface facing the user, if necessary with the interposition of a fluid-tight film coated onto the material protective layer, and is connected therewith by the foaming process. In this way, manufacturing time and hence the cost of production are reduced and the handling of the individual parts is simplified.

The material protective layer provided on the surface of the cushion facing the user is preferably attached to the supporting body by a layer of adhesive which is preferably air-permeable to enhance ventilation and comfort.

A flameproofing layer is preferably arranged between the material protective layer and the supporting body, comprising an open-celled resilient foamed plastic, with a density different from that of the supporting body, to enhance the flame resistance and the fire bearing capacity of the seat. This layer is preferably coated on the surface of the material protective layer facing the supporting body, to reduce the thickness of the fireproofing layer and improve comfort.

The invention also provides a seat cushion, in particular an aircraft seat, comprising a supporting body of a foamed plastic with a spring core embedded therein and a flameproofing layer of flame-retardant plastic foam, with which a covering material is connected, in particular in a detachable manner, preferably as defined above, wherein in the supporting part or respectively supporting body in the region of the more intensely stressed zone, a supporting device, in particular a spring core, e.g. of metal wire, is foamed in, whereby the reduced strength or resistance caused by the recesses for an improved ventilation can be balanced out again and hence the foam material of the supporting part or respectively of the supporting body can also maintain its shape over a longer period of use.

The spring core preferably has a base surface approximately flush with an underside of a supporting part or supporting body, so that a major proportion of the stresses acting on the spring core can be diverted into a supporting structure, and hence the shear stresses exerted on the supporting part or supporting body can be reduced by the spring core.

The spring core preferably has a covering surface spaced from an upper part of the supporting part or body, preferably by a distance of 5 to 70 mm. In this way from the outset an adverse effect on sitting comfort can be prevented. Through the selection of the distance between the upper side of the supporting part or body and the cover surface of the spring core, moreover, the spring characteristic of the seat can be better adapted to the individual wishes of the customer.

The height of the spring core foamed into the supporting part or body is preferably smaller than the thickness of the spring when unstressed. With this prestressing of the spring core and alteration to the spring characteristic, the action of the spring core only starts after a certain load. Thereby, in the case of people of low weight, the spring core scarcely comes to bear, whereas when used by people of heavier weight, it takes up a proportion of the weight and hence saves the plastic structure of the supporting part or respectively of the supporting body from overloading.

The base and covering surfaces of the spring core are preferably spaced apart from one another by means of bracing elements the length of which, running vertically to the base surface, is smaller than the thickness of the spring core when unstressed. The spring characteristic of the spring core can be altered by varying this spacing.

The terminal edges of the spring core are preferably spaced from the lateral faces and the rear end face of the supporting body, so that in the case of a fire, the spring core is insulated by the plastic foam surrounding it and hence the temperature increase of the spring core is reduced. Thereby, the spring core can be prevented over a long period of time from beginning to glow. In addition, back-lighting through the glowing spring core can be avoided, when the fire extinguishes itself through the self-extinguishing properties of the supporting body or respectively of the flameproofing layer.

Recesses are preferably provided in the region in which the spring core is arranged, running vertically to the lateral and/or upper face of the cushion, to ensure that a sufficient quantity of air can be removed through the seat, so that the sitting climate of such a seat is not adversely affected by the spring core. These recesses are preferably spaced from the spring core or parts thereof so that in the case of a fire the spring core cannot heat up too rapidly through the hot fire gases, whereby the security with respect to back-lighting can be further increased. Recesses are also preferably arranged between the lateral edges of the spring core and the lateral faces of the supporting part, so that via recesses running vertically to the surface, a sufficient air exchange is achieved, whereby through recesses running vertically to the lateral faces of the seat cushion, these recesses can be pressed together when the seat is being used, so that they act in the manner of a bellows and lead to an automatic removal of air or respectively ventilation of the seat. This is above all because through the vibrations of the vehicle or respectively movements of the user on the seat or through displacements of the body of the person using the seat, a sufficient air exchange can also take place via this recess during use.

BRIEF DESCRIPTION OF THE DRAWINGS

Further objects and advantages of the invention will become apparent from the following detailed description when read in conjunction with the accompanying drawings which illustrate preferred embodiments thereof.

In the drawings:

FIG. 2 shows a seat cushion according to a first embodiment of the invention, comprising a sitting part and supporting part, in side view, in cross section along the line II—II in FIG. 3;

FIG. 3 shows the seat cushion according to the invention in front view, in cross section, along the line III—III in FIG. 2;

FIG. 6 shows from the front a vertical cross section of a seat cushion according to a second embodiment of the invention with parts of the fireproofing layer overlapping the supporting part;

FIG. 7 shows from the front a vertical cross section of a seat cushion according to a third embodiment of the invention, with parts of the covering material, projecting over the bearing surface of the supporting part in the direction of the sitting part, or respectively of the fireproofing and/or intermediate layer;

FIG. 8 shows a seat cushion in accordance with a fourth embodiment, in a view from below, partially in section;

FIG. 9 shows a seat cushion in accordance with a fifth embodiment, in front view, partially in section;

FIG. 21 shows a further embodiment of a seat cushion according to the invention, in simplified schematic representation.

DETAILED DESCRIPTION OF THE PREFERRED EMBODIMENTS

Figure 1:
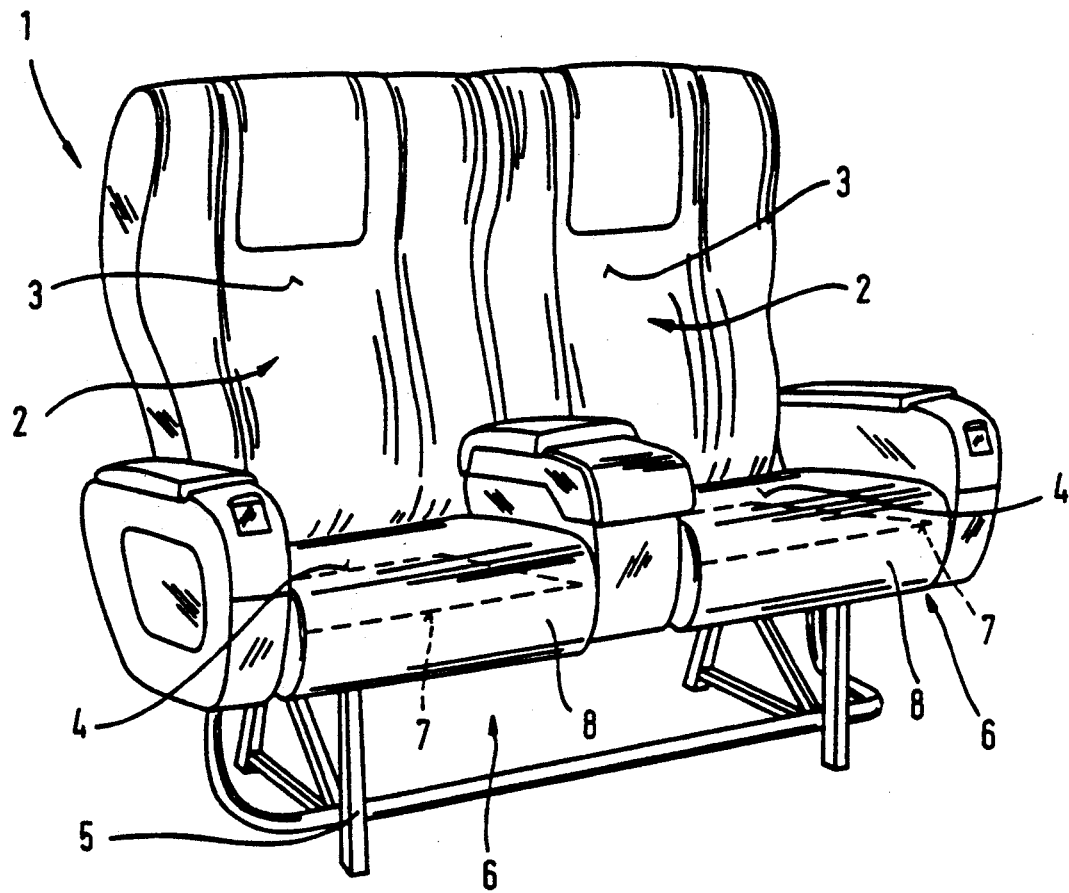
FIG. 1 shows a double bench seat for an aircraft, with seat cushions according to the invention and with back rests.

Referring first to FIG. 1, a double bench aircraft seat 1 with two seats 2 is illustrated. Each of the seats 2 comprises a back rest 3 and a seat cushion 4. The cushions 4 are identical in construction. The back rest 3 and the seat cushion 4 are placed into a supporting frame 5, which may also have any other desired shape.

As indicated schematically, the seat cushion 4 has a supporting body 6, which is formed from a supporting part 7 and a sitting part 8.

Figure 4:
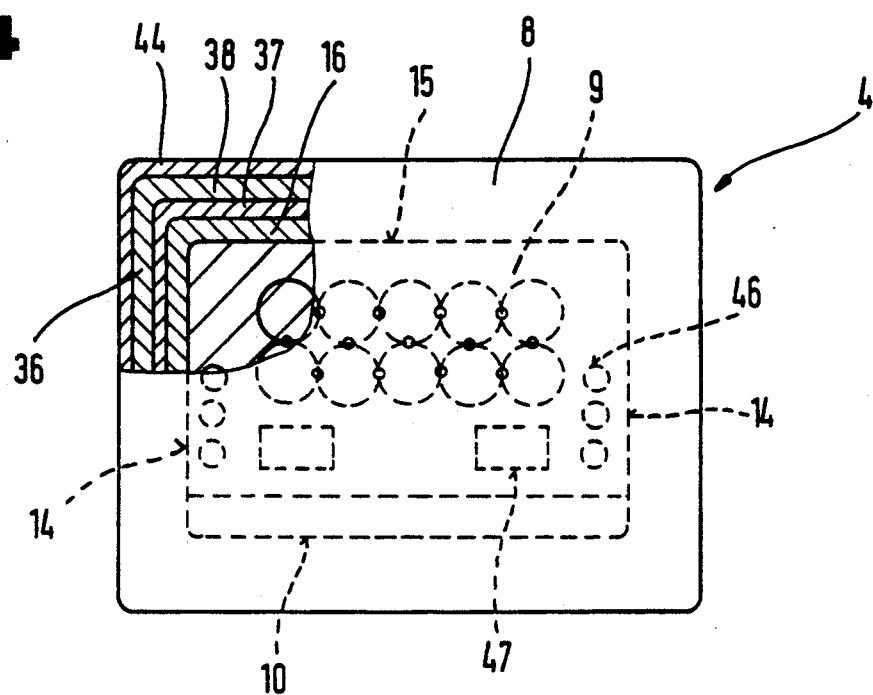
FIG. 4 shows a supporting part of the seat cushion of FIGS. 2 and 3, in plan view.

As can be seen in further detail from FIGS. 2 to 4, a spring core 9 is embedded in the supporting part 7. This spring core lies in a rear half of the seat cushion 4, facing away from an end 10, and extends almost over a full thickness 11 of the supporting part 7, i.e. from an underside 12 to a bearing face 13. The underside 12, lateral edges 14 and a rear end edge 15 are encased by a covering material 16, which also extends over the front edge 10. Consequently, only the bearing surface 13 remains without covering by the covering material 16.

As can be further seen from the illustration, in particular in FIG. 2, node points 17 of longitudinal and transverse wires 18, 19 are arranged in the region of grooves 20 in the underside 12 of the supporting part 7. Consequently, the projections 21 lying between the grooves 20 project over a lower bearing face 22 of the spring core 9 so that, when the seat cushion 4 lies on a flat-surfaced supporting frame 5, premature destruction of the covering material 16 by the node points 17 cannot occur and in these regions a longer lifespan of the covering material 16 is achieved.

In addition, it is also possible, for example at least between the bearing face 22 of the spring core 9 and the underside 12 and the covering material 16 arranged thereon, to arrange an intermediate layer 23 of high-strength fibres or threads in the manner of a knitted fabric, net, lattice or the like, which may consist of metal, carbon, plastics, ceramics or the like and additionally or at the same time may also be resistant to high temperatures. This intermediate layer 23 furthermore may also if desired, extend over the front end surface 10, the lateral edges 14 and the rear end surface 15, i.e. over the entire surface with the exception of the bearing face 13.

On the bearing face 13 of the supporting part 7, furthermore, burred tapes 24 are arranged, which cooperate with mating burred tapes 25 of burred closures 26, which are arranged on the bearing face 27 of the sitting part 8, lying opposite the bearing face 13. These burred closures 26 serve to attach the sitting part 8 on the supporting part 7 in a detachable manner.

The supporting part 7 may be produced in one piece from a foamed plastic. This plastics foam may be open-celled, and may, moreover, have different elasticity values adapted to the respective case of usage.

In a modification of this embodiment shown in FIG. 3, it is possible to compose the supporting part, as shown by vertical broken lines, from several layers 28, 29, 30 of different foamed plastics 31, 32, 33.

The spring core 9 is incorporated into the supporting part 7 during foaming. Here, it is possible to prestress the spring core 9 in the foaming mould for the supporting part 7, i.e. to give a higher elastic force in accordance with the physical properties of spring and to achieve a corresponding spring behaviour with the use of a smaller wire thickness of the springs. This makes it possible to keep the weight of the spring core 9, and thus of the supporting part 7, low.

The sitting part 8 is formed from a foamed plastic 34 and tapered so as to become narrower from the end edge 10 in the direction of the end edge 15. Advantageously but not necessarily, the foamed plastic of the sitting part has a lower density than that of the supporting part 7. The sitting part 8 is enveloped by a frameproofing layer 36 on an upper side 35 and in the direction of the supporting part 7 projecting beyond the bearing face 27 of the sitting part 8. The sitting part 8 may also be provided with an intermediate layer 37, which is arranged between a flameproofing layer 36, formed from a flame-retardant, open-celled foarged plastic 38, and the foamed plastic 34 of sitting part 8. This immediate layer 37 may be formed, like the intermediate layer 23, from high-strength fibres or threads in the manner of a knitted fabric, net, lattice or the like, which may consist of metal, carbon, plastics, ceramics or the like or of any desired combinations thereof and additionally or at the same time may also be resistant to high temperatures. If the intermediate layer 37 is arranged, it is preferably formed by fibres or threads of carbon, metal, polyester, aramid fibres such as Kevlar ®, ceramics, polytetrafluoroethylene such as Teflon ® or other plastics resistant to high-temperatures, which is arranged on the surface 39, facing the foamed plastic 34 of the sitting part 8, of the foamed plastic 38 forming the flameproofing layer 36, and preferably is stuck thereto. The flameproofing layer 36 formed by the plastics foam 38 and intermediate layer 37 is connected with a connecting face 40, facing the upper side 35, of the foamed plastic 34. It may be stuck thereto or is foamed thereon or on a fluid-tight barrier film which is connected with the flameproofing layer 36.

The regions of the flameproofing layer 36 and intermediate layer 37 projecting beyond the bearing faces 13 and 27, overlap the end surfaces 10, 15 and the lateral edges 14 of the supporting part 7. They are preferably attached with burred tapes 41, 42 arranged in the overlapping region on the supporting part 7 to the covering material 16 of the supporting part 7 and the flameproofing layer 36 or, if provided, the intermediate layer 37. Thereby, the end surfaces 10, 15 and lateral edges 14 are covered approximately up to the region of the underside 12 by the flameproofing layer 36. On the underside 12 of the supporting part 7 or of the covering material 16 arranged on the supporting part 7, burred tape arrangements 43 are arranged for the attachment of a preferably flame-resistant covering material 44, surrounding the sitting part 8 and the supporting part 7 up to the region of its underside 12. An attachment of the seat cushion 4 on a frame part 45 of the supporting frame 5 of the double bench seat 1 is likewise possible by means of burred tape arrangement 43.

As illustrated with broken lines, in FIG. 2 it is possible, preferably in the plastics foam 34 of sitting part 8, to provide perforations 46 or cavities 47 in seat cushion 4. This creates different zones of elasticity, which take into account the different loads or the sitting comfort. In addition, these perforations 46 or cavities 47 bring about an improved ventilation in the regions immediately adjoining the upper side of the seat 2, which has an advantageous effect in the use of these seats in the case of greatly varying conditions and also in the case of contact over a lengthy period of time, e.g. in long-haul flights.

Figure 5:
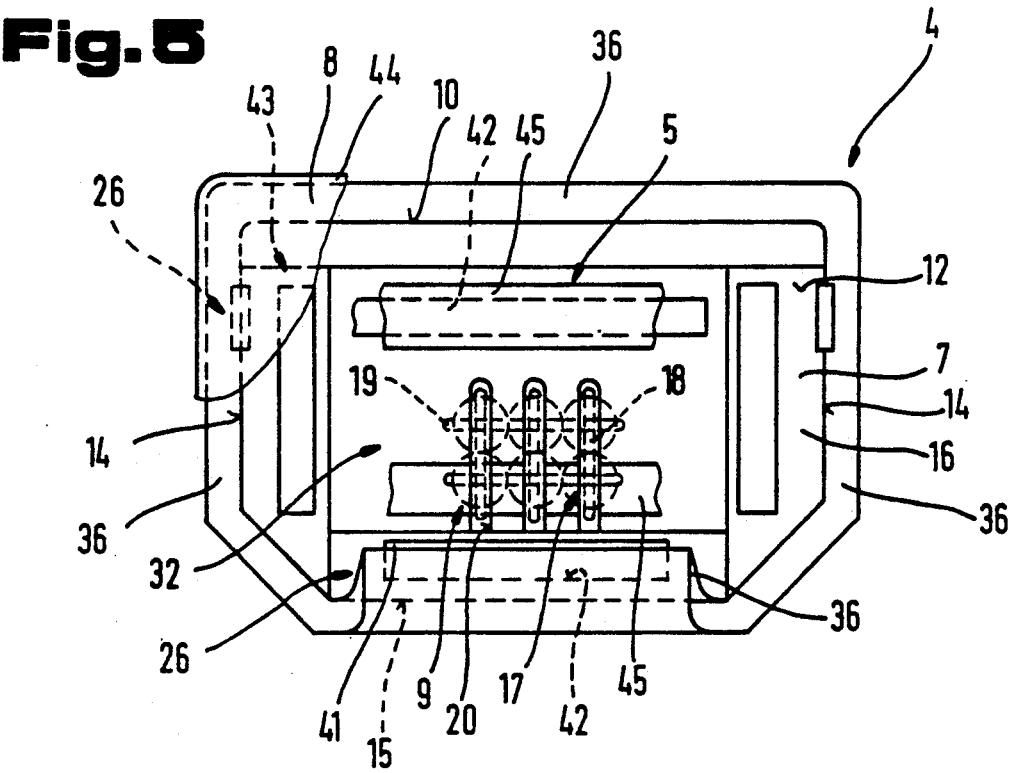
FIG. 5 shows a supporting part of a seat cushion of FIGS. 2 to 4, in a view from below with the burred tapes of a burred closure arranged thereon.

In FIG. 5, the seat cushion 4 is shown with the supporting part 7 and the sitting part 8 in a view from below, in which the same reference numbers are used for the same parts. The supporting part 7 is overlapped on the end surface 10 and 15 and the lateral edges 14 by the flameproofing layer 36 in the direction of the underside 12. In the region of the rear end face 14, the flameproofing layer 36 overlaps the underside 12 of the supporting part 7 in the direction of the front end edge 10. In this region, on the covering material 16 forming the underside 12 of the supporting part 7, the burred tape 41 is arranged, e.g. through sticking, welding, etc., and forms there, with the burred tape 42 which is arranged on the flameproofing layer 36, the burred closure 26 for the attachment of the sitting part 8 in the region of the rear end face 15 on the supporting part 7. As additionally drawn in broken lines, it is also possible to arrange burred closures 26 in the region of the lateral edges 14 between the supporting part 7 and the sitting part 8 for the fixing of the flameproofing layer 36 projecting over the supporting part 7 in the region of the lateral edges 14.

Approximately in the rear third of the supporting part 7, spring core 9 is foamed in the formed plastic 32 of the supporting part 7. In the region of the node points 17 between the longitudinal wire 18 and the transverse wire 19 of the spring core 9, the grooves 20 are arranged, which produce depressions in relation to the underside 12. Thereby, the regions associated with the grooves 20 are spaced from frame part 45, whereby the risk of damage or chafing of the covering material 16 is prevented.

It can be seen in addition that on the underside 12, the burred tape arrangements 43 are arranged for the attachment of the covering material 44 covering the upper side 35 of the seat cushion 4, which covering material extends into the region of the underside 12. Further burred tapes 42 serve for the fixing of the seat cushion 5 onto the frame parts 45 of the supporting frame 6.

This embodiment of the seat cushion 4 with its supporting part 7 and the sitting part 8 presents great advantages with regard to the continuous maintenance of these highly stressed seats, because the individual elements are able to be rapidly exchanged in the case of damage, and as in addition it does not represent any great expenditure to carry out cleaning in particular of the sitting part 8 at short intervals. The exchanging only requires a small expenditure of time and no specialist personnel, and in addition no tools are necessary. In addition to this, the sitting parts 8, which are subject to a higher degree of wear, can be exchanged whilst retaining the supporting part 7 and consequently the overall costs for the seat cushions can be reduced over the lifespan of an aircraft. This division of the seat cushion 4 into sitting part 8 and the supporting part 7 also brings advantages in that for example the supporting part 7 can be produced in very high quantities in industrial manufacture in series, and then, depending on the intended use, provided with a sitting part 8 designed for the desired type of seat cushion 4.

In FIG. 6, another embodiment of the seat cushion 4 is shown, formed from the supporting part 7 and the sitting part 8, in which the same reference numbers are used for the same parts as in the preceding figures. The sitting part 8 has the flameproofing layer 36, which overlaps the supporting part up to the region of the underside 12, in which burred tapes 41 are attached, for example stuck on, welded on, etc., on the underside 12 or on the material 16 covering the underside 12, which burred tapes 41 cooperate with burred tapes 42 which are arranged on the flameproofing layer 36. Thereby it is ensured that the flameproofing layer overlaps the supporting part 7 up to the region of the underside 12 and thereby no openings arise on the lateral edges 14 or end surfaces 10, 15, whereby also in these regions penetration of flames in the case of fire is effectively prevented. The flameproofing layer 36 is additionally covered by the covering material 44, which is attached via the burred tape arrangements 43, which are likewise arranged on the underside 12 adjacent the burred tapes 41, 42 in the direction of a central axis 48.

In FIG. 7 another embodiment of the seat cushion 4 is shown, in which the same reference numbers are used for the same parts as in the preceding figures. In this embodiment, the supporting part 7 is provided on the underside 12 with the flameproofing layer 36, e.g. the flame retardant foamed plastic 38 and the intermediate layer 37 associated with the foamed plastic 33 of the supporting part 7, which intermediate layer projects over the lateral edges 14 and end surfaces 10, 15 beyond the supporting part 7 by a distance corresponding to thickness 49 of the sitting part 8 in the direction of the upper side 35. The sitting part 8 has on its connecting face 40 facing the upper side 35 the intermediate layer 37 and the flameproofing layer 36 formed from the flame retardant foamed plastic 38, ending at the lateral edges 14 and end surfaces 10, 15 corresponding to the external outline of the supporting part 7. The covering material 44 arranged on the upper side 35 of the supporting part 8 overlaps the sides 14 and end surfaces 10, 15, in the direction of the underside 12 of the supporting part 7 and is attached to the supporting part 7 by means of the burred tape arrangements 43 arranged on the lateral sides 14 and end surfaces 10, 15.

This embodiment makes possible an exchange of the sitting part, in which through the burred tape arrangements 43 in the region of the lateral tides 14 and end surfaces 10, 15 a rapid dismantling is made possible because the regions of the underside 12, to which access is difficult, do not have any fixing devices or burred tape arrangements 43 for the covering material 44. Furthermore, in this embodiment, it is possible to dispense with additional fixing arrangements between the supporting part 7 and the sitting part 8 and to undertake the attachment of these elements to each other through the covering material 44, overlapping into the region of the underside 12, with the burred tape arrangements 43. Thereby, a further simplification in the manufacture of the seat cushion 4 is achieved, whereby this represents a very favourable solution with regard to cost.

Finally, the arrangement of the spring core is not of course bound to the position illustrated in the figures, but the core may be provided in any desired region of the supporting part, if necessary also with different vertical or strength factors or elastic forces, distributed over the cross-section. Furthermore, the embodiment of the individual layers, the use of the various raw materials for the plastics foams and the like may be modified as desired, in order to match them to the various requirements.

The supporting body 6, which is formed from the supporting part 7 and the sitting part 8, may preferably be formed from the underside 12 in the direction of the upper side 35 from foamed plastics with differing density, in which, preferably, in the direction of the upper side 35, the foamed plastic has a lower density. Generally the preferred density of the foam used for the supporting body 6 is 20 kg/m³ to 80 kg/m³. The flameproofing layer 36 may be formed by the flame-retardant formed plastic 38, the intermediate layer 37 and the flame-retardant covering material 16, 44, only by a flame-retardant covering material 44, or flame-retardant covering materials 36, 44 in combination, with the intermediate layer 37 comprising high temperature resistant fibres or threads. This flameproofing layer 36 may be arranged on the supporting part 7 and/or the sitting part 8.

In FIG. 8, which shows a bottom view of the seat cushion 4—in which the same reference numbers were used in turn for the same parts—a possible distribution of recesses 50, 51, 52, 53, 54 is illustrated, in combination with a supporting device 55, which is formed by the spring core 9. From this illustration, it can be seen that in addition to the reinforcement of a central sitting surface 56, achieved by the spring core 9, which surface 56, as indicated with dot-and-dash lines, is formed by the bottom and the side of the upper thighs facing the seat cushion 4, the number of recesses 50 to 54 is greater than in the remaining regions. Thus, in these regions which are affected most strongly both by bodily perspirations and from the point of view of weight, a corresponding exchange of air is achieved and, through also using the supporting device 55, a long lifespan of the seat cushion 4 is achieved. At the same time, however, a reduction in weight of the seat cushion 4 is achieved, because in the region in which the spring core 9 is arranged, through the greater number of recesses 50 to 54, weight is saved in the supporting part 7 of plastics foam. If this saving in weight is not sufficient to take up the excess weight of the spring core 9, then for example recesses 58 may also be provided in lateral faces 57, which then serve principally for weight reduction and only bring immaterial improvements to the "sitting climate" of such a seat cushion 4.

Of course a spring core 9 or a correspondingly constructed supporting device 55 can also be used in those seats in which an intermediate layer 59 is formed by a moisture- or fluid-tight barrier film 60. In this case, through suitable measures it should be ensured that after the direct foaming on of the supporting part 7 onto the barrier film 60, a sufficient passage of air is brought about in the direction of the covering material 44 or of the flameproofing layer 36. This may take place by melting on or milling off the intermediate layer 59. If a barrier film of high-strength fibres is arranged in addition to this fluid- or moisture-tight barrier film 60, then this barrier film of high-strength fibres may also be removed in the region of the perforations with larger openings, for example by cutting out or separating individual springs or lattice parts, in order to achieve a greater permeability by air in the direction of the caverns formed in the flameproofing layer 36 consisting of opencelled plastics foam.

In FIG. 9 a further embodiment is illustrated, in which the same reference numbers are used for the same parts as in the preceding figures.

The seat cushion 4 of FIG. 9 again comprises the flameproof covering materials 16, 44, a flameproofing layer 36, an intermediate layer 49 and a supporting body 61. The flameproof covering material 16 is connected on a rear face 62 of the seat cushion 4 via an adhesive 63 with the flameproofing layer 36, whilst the part of the covering material 44 facing the sitting surface 56 is exchangeable by means of burred tapes 64.

In the interior of the supporting body 61, produced from a plastics foam mixed with solid flame retardants, a spring core 9 is foamed in as supporting device 55. Whilst in the previously described embodiments, the plastics foam of the supporting body 61 entirely penetrates the spring core 9, in this embodiment, the supporting device 55 is surrounded by a plastics film 65 or is encased therein. The plastics film 65 is air-tight and is also secured with air-tight welds, so that it acts as an air cushion 66 with the supporting device 55 embedded therein. In the case of a loading of the supporting device 55, i.e. the spring core 9, the air in the air cushion 66 is more highly condensed and the seat, after being relieved of the load, returns into its original position again through the action of the spring core 9. The advantage of this embodiment lies above all in that a volume of air is created in the supporting body 61, so that the seat cushion 4 can be used to a limited extent as a float. It is only important here that the buoyancy of the seat cushion 4 is so great that a person moving in the water receives sufficient buoyancy to keep himself above water.

The supporting device 55, arranged in the supporting body 61, for example the spring core 9, serves to increase the lifespan and to alter the spring characteristic of the seat cushion 4. In order now to be able to match the spring characteristics to particular requirements, the height 67 of the supporting device 55 between base surface 68 and cover surface 69 in a layer foamed into the supporting body 61 is smaller than the thickness 70 of the supporting device 55 or of the spring core 9 in its unstressed state. This prestressing is achieved in that the base surface 68 and the cover surface 69 are spaced apart from each other by means of bracing elements 71, the length of which, running vertically to the base surface 68, is smaller than the thickness 70 of the unstressed spring core 9. It is thus possible to prestress the supporting device 55, i.e., the spring core 9, to any desired extent, so that the spring characteristics of such a seat cushion 4 can be altered in any desired manner.

In this embodiment the cover surface 69 is covered by an intermediate layer 72. Such an intermediate layer may be placed directly onto the cover surface 69. A thicker layer can thus be achieved, and through this a uniform distribution of the load onto the entire spring core 9, without parts of the spring core 9 being felt by the user as intrusive pressure sites. Such an intermediate layer 72 may consist of a network, lattice, knitted fabric or the like, of wire or of glass fibres, preferably a lattice which has a correspondingly high inherent rigidity, so that it can span the cover surface 69 in the manner of a bridge, in order to make possible a sufficient load distribution over the entire cover surface 69 of the spring core 9.

In addition, in this embodiment, the density of the plastics foam of the supporting body 61 may be higher in the region between the cover surface 69 of the supporting device 55 and the intermediate layer 59, than in the remaining regions of the supporting body 61. This is indicated diagrammatically by denser shading of the region between the cover surface 69 and the intermediate layer 59. The loads which act on the seat cushion 4 in the direction of load—arrow 73—can thus be distributed uniformly over the spring core 9. Through the greater hardness of a denser foam material of the supporting body 61, a type of resilient insert plate is created, which distributes loads, acting partially in a punctiform manner, by the person sitting on the seat, uniformly onto the spring core 9. Thereby, pressure sites by individual parts of the spring core 9 are avoided.

This increase in the density of the foam material of the supporting body 61 in the region above the spring core 9 may be achieved by the intermediate layer 72 which leads to a more rapid cooling of the plastic foam and hence to a higher density. However, it is also possible, through corresponding temperature controls, to accelerate hardening in this region of the mould in the production of the supporting body 61, to achieve higher density or the formation of a thicker skin. This thicker skin has the advantage that it has a higher number of closed cells.

Figure 10:
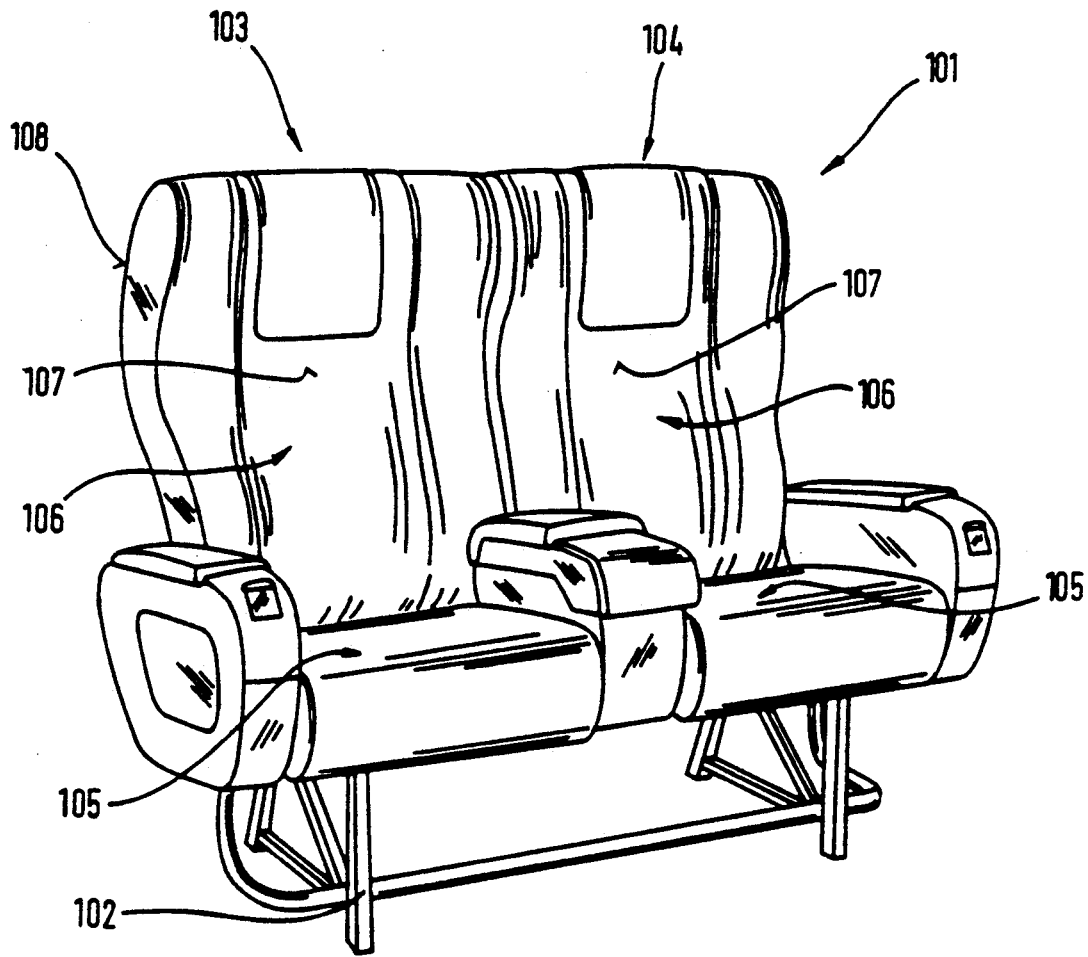
FIG. 10 shows a bench seat, as usually used in aircraft, with a seat cushion constructed according to the invention, in simplified, schematic, diagrammatic representation.

In FIG. 10, a bench seat 101 is shown, in particular for use in a passenger aircraft, but which is also suitable in a similar manner for example for railways, in particular for long-distance trains or the like. This bench seat 101 consists of a supporting frame 102 and two seats 103 and 104 arranged thereon. Each of the seats 103 and 104 is produced from a seat cushion 105, forming a sitting surface, and a seat cushion 106 forming a back rest. The seat cushion 106 has a surface 107 facing a user and a rear surface 108 facing away therefrom. The seat cushions 105 and 106 are usually inserted into the supporting frame 102 and are fixed thereon if necessary with burred tapes and the like.

Figure 11:
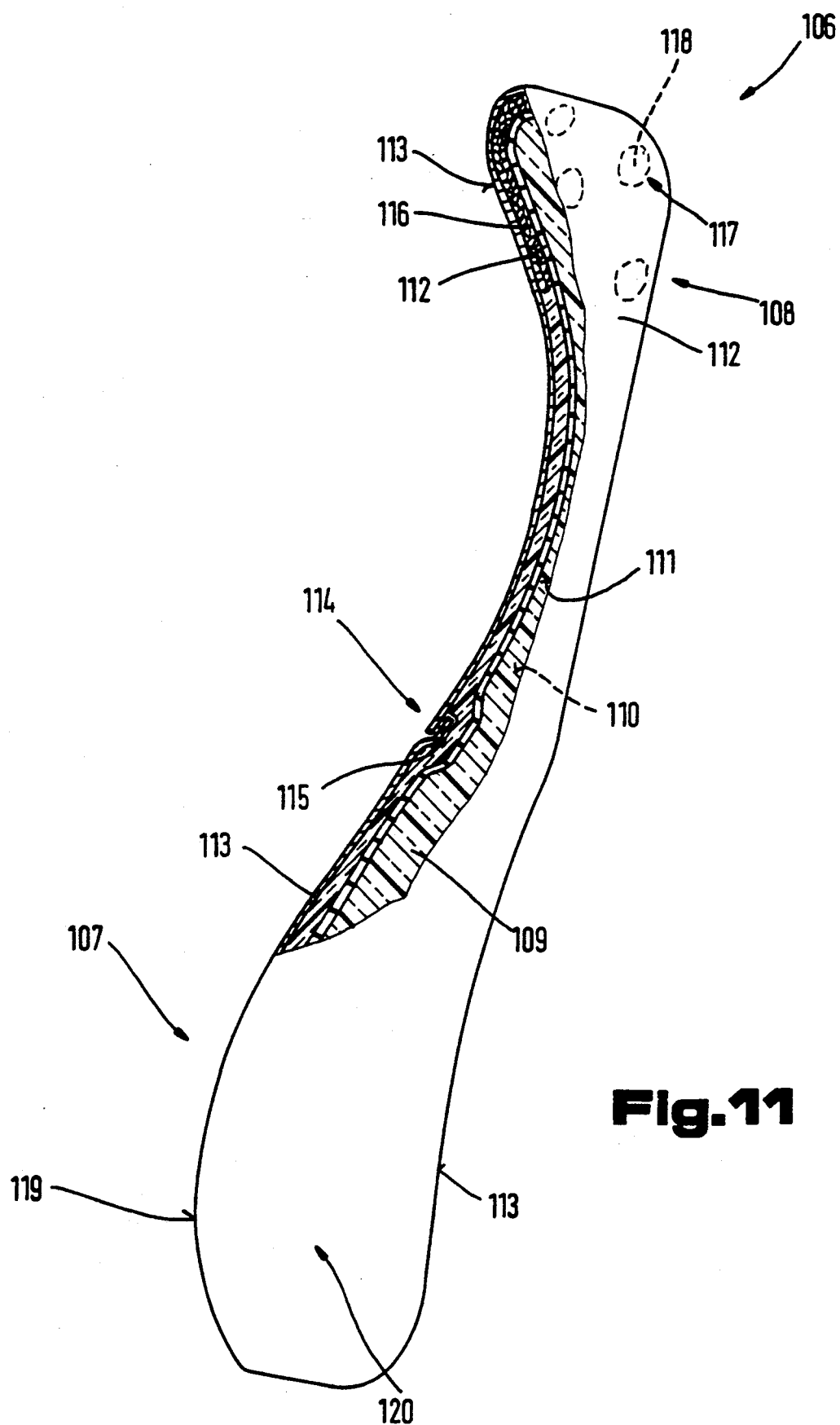
FIG. 11 shows a seat back cushion according to a sixth embodiment of the invention, in side view, partially in section.

In FIG. 11, the seat cushion 106, forming the back rest, is shown on an enlarged scale. The seat cushion consists of a supporting body 109 of plastics foam 111, mixed if necessary with flame-retardant materials 110, which is usually constructed so as to be open-celled or with a large proportion of open cells. This supporting body 109 is surrounded on all sides by a material protective layer 112. A casing of a covering material 113 may be placed directly onto this material protective layer 112, which casing of covering material 113 may be attached if necessary by means of a detachable connecting device 114, e.g. burred tapes 115, on the material protective layer 112. However, it is also possible to arrange between the material protective layer 112 and the covering material 113 a flameproofing layer 116 of an open-celled, resilient foamed plastic with a lower density than the supporting body 109. This flameproofing layer 116 is, however, not obligatory and may also be entirely eliminated depending on the case of application. The material protective layer 112, as shown diagrammatically in the upper region of the seat cushion 106, is fixed in its position on the supporting body 109 with layers 117 of adhesive 118 distributed over the surface. The material protective layer 112 may extend here in a seamless manner from the rear surface 108 into the region of a lateral edge 119 between the surface 107 and lateral faces 120. The material protective layer in the region of the surface 107 may then be formed by a further material part. On the other hand, however, it is likewise also possible to arrange the material part of the material protective layer 112, forming the surface 107 or respectively facing the latter, over the lateral faces 120 into the region of the rear surface 108, and to provide the joint between the material parts of the material protective layer 112 between the lateral faces 120 and the rear face 108. The position of the plane of separation is preferably established as a function of the desired deformation behaviour of the seat cushion 106 and the mechanical stresses owing to the construction of the supporting frame 102 for the seat cushion 106, and can be arranged accordingly, as desired.

Of course, the embodiments described for the seat cushion 106 may also be used for the production of the seat cushion 105 and the statements made hitherto and the subsequent embodiments also apply to the seat cushion 105 in an identical manner.

Figure 12:
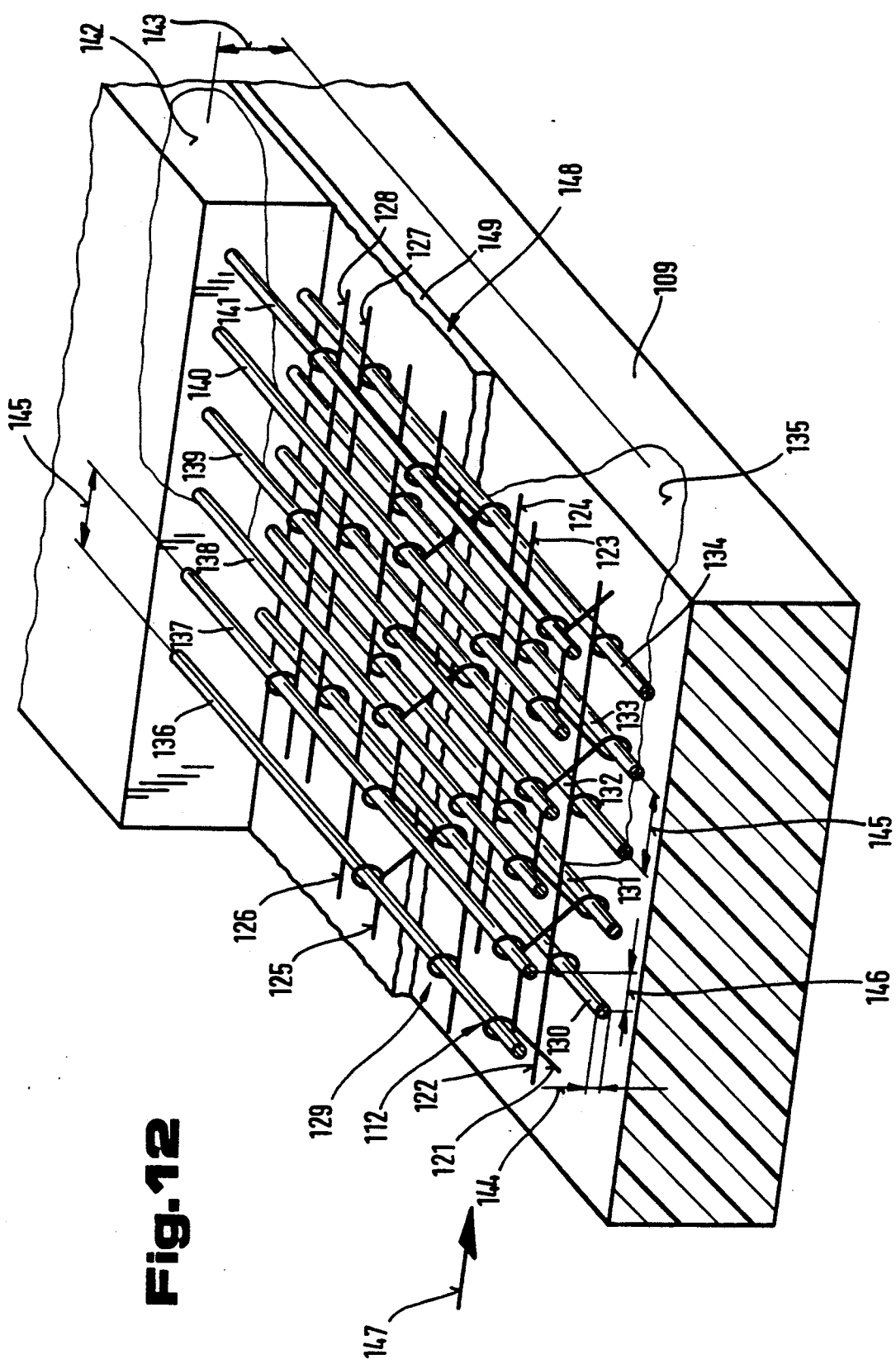
FIG. 12 shows the structure of the material protective layer and its integration into the overall structure of a seat cushion according to the invention in a greatly simplified, diagrammatic representation.

In FIG. 12 the material protective layer 112 is illustrated diagrammatically in the manner of a knitted pattern, in which the individual weft threads 121, 122, 123, 124, 125, 126, 127, 128 of a group 129, each drawn only as a line, are shown in their looping path in relation to the warp threads 130 to 134, which are arranged in a plane 135 indicated diagrammatically by thin lines, and the warp threads 136 to 141, which are arranged in a plane 142 indicated diagrammatically by thin lines.

The two planes 135 and 142 are spaced apart from each other vertically by a distance 143, which corresponds at least to the thickness 144 of one of the warp threads 130 to 134 and 136 to 141.

The structure of the material protective layer 112 is such that the weft thread groups 129 are arranged in the required number one after the other in longitudinal direction of the warp threads 130 to 134 or respectively 136 to 141.

To form the material protective layer 112 the warp threads 136 to 141, arranged in a uniform distribution 145 in longitudinal direction of the weft threads 121 to 128 in the plane 142, are likewise enmeshed with the warp threads 130 to 134 arranged in the further plane 135 likewise in the uniform distribution 145. The warp threads 130 to 134 of the lower plane 135 are staggered with respect to the warp threads 136 to 141 of the upper plane 142 by a half spacing 146 in the direction of the weft threads 121 to 128.

The path of the individual weft threads 121 to 128 is now as follows: The weft thread 121 loops around two warp threads 136 and 137 of the upper plane 142, which are arranged in the spacing 145 from each other, then loops around the warp thread 131 of the lower plane 135, which is arranged between the last warp thread 137 looped around in the upper plane 142 and the warp thread 138 immediately following it in the woof direction—arrow 147—, then loops around the warp threads 138, 139 of the upper plane 142, then the warp thread 133 of the lower plane 135, then again two warp threads 140, 141 of the upper plane 142 and so on.

The following weft thread 122, in longitudinal direction of the warp threads in the meshing direction, however, merely loops around the warp threads 130, 132, 134 arranged in the lower plane 135 at a distance corresponding to twice the spacing 145.

The weft thread 123 arranged thereafter, however, in the lower plane 135 loops around the warp threads 131, 133 which have not been looped around with the previous weft thread 122, and so on. Thereafter follows a weft thread 125, only associated with the warp threads of the upper plane 142, which weft thread 124 in turn merely loops around the warp threads 136, 138 and 140 arranged at a distance of twice the spacing 145.

The weft thread 125 then has the same type of looping, with regard to the path, as the weft thread 121, but in the lower plane 135 only the warp thread 130, 132, 134 is looped around, which was not looped around by the weft thread 121. An identical displacement of the warp threads 137 and 138 and also 139 and 140, connected with each other by the weft thread 125 in the upper plane 142, takes place with respect to the warp threads 136 and 137, 138 and 139 and also 140 and 141, connected with each other by the weft thread 121 in the upper plane 142, by the spacing 145.

There follows on therefrom a weft thread 126, which loops around the same warp threads 131, 133 as the weft thread 123 and the subsequent weft thread 127 loops around the same warp threads 130, 132, 134 as the weft thread 122.

The conclusion of the weft thread group 129 is formed by the weft thread 128, which loops around those warp threads 137, 139 and 141 which are arranged in the upper plane 142 and which are not looped around by the weft thread 124.

The material protective layer 112 is stuck by means of adhesive 149 over a layer 148, in this case over the complete surface, onto the supporting body 109, in which the material protective layer 112 is illustrated diagrammatically as a block in the region adjoining the illustration of the individual threads.

Figure 13:
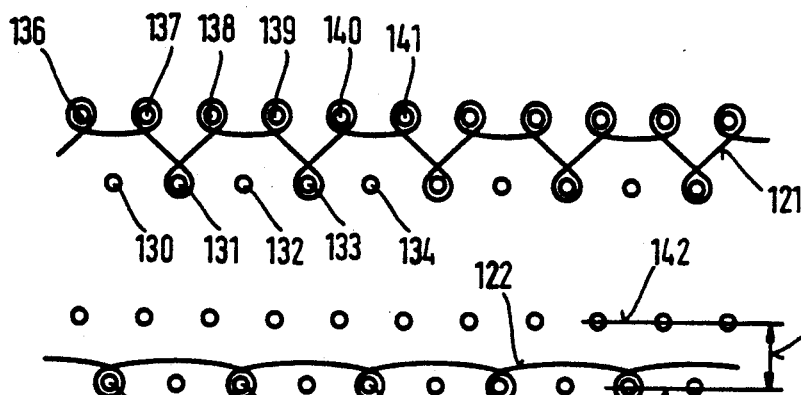
FIGS. 13 to 20 show in schematic cross sectional front view, various paths of weft threads around the warp threads, arranged in several planes, of material protective layers which can be used in seat cushions according to the invention.
Figure 14:
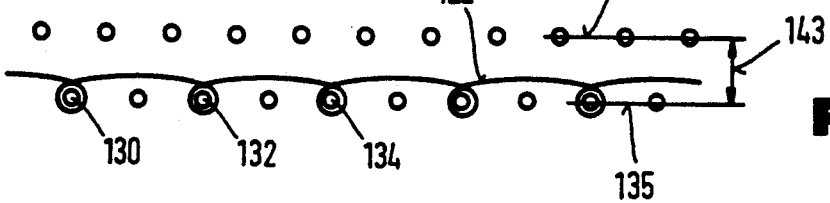
Figure 15:
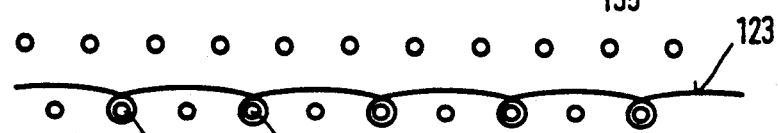
Figure 16:
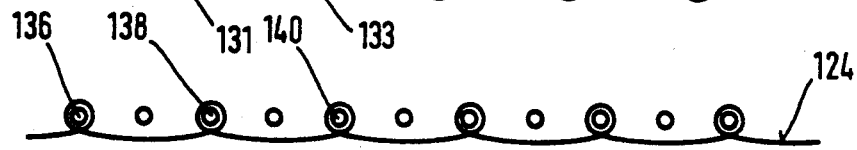
Figure 17:
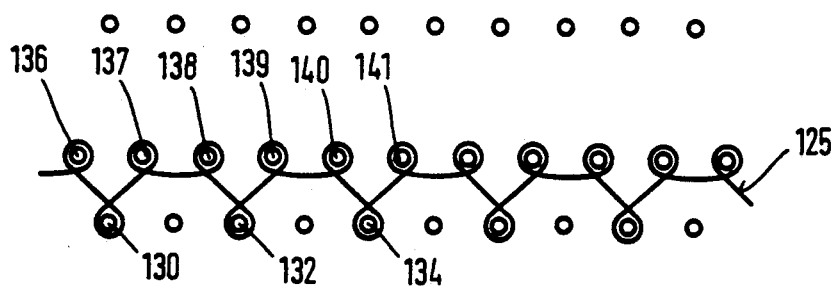
Figure 18:
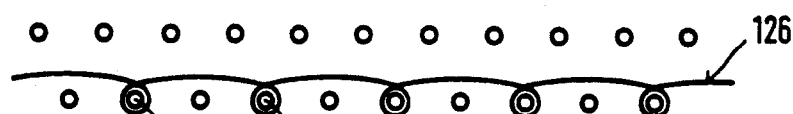
Figure 19:
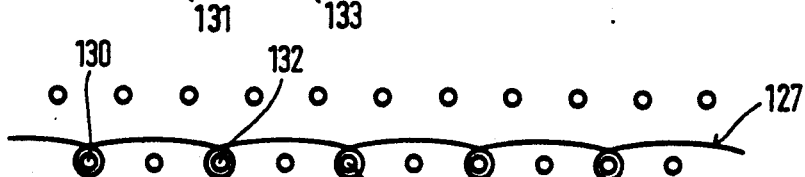
Figure 20:
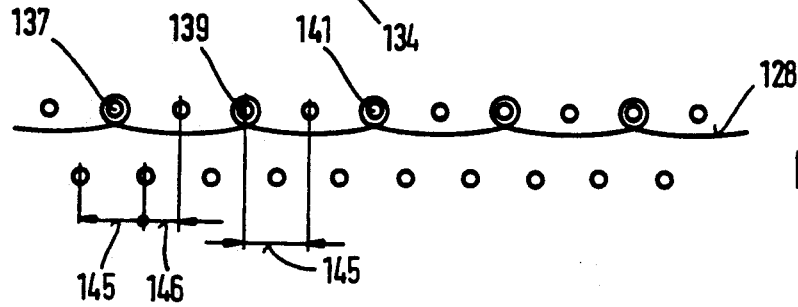

Furthermore, the looping path of the weft- and warp threads 121 to 128, 130 to 134 and 136 to 141 is illustrated in end view for the weft thread 121 in FIG. 13, for the weft thread 122 in FIG. 14, for the weft thread 123 in FIG. 15, for the weft thread 124 in FIG. 16, for the weft thread 125 in FIG. 17, for the weft thread 126 in FIG. 18, for the weft thread 127 in FIG. 19 and for the weft thread 128 in FIG. 20, so that viewing together the loops of the weft threads 121 to 128 in FIGS. 13 to 20 produces a weft thread group 129. Over the entire length of the material protective layer 112, therefore, the weft thread groups 129 are arranged recurrently.

In FIG. 21 a variant embodiment of the seat cushion 106 is shown, in which the individual layers are indicated diagrammatically by blocks.

It can be seen from this illustration, that onto a material protective layer 112, with the interposition of a film 150, if necessary coated thereon, for example a polyethylene- or polyurethane (PU) film, which may be constructed as a melting film, the supporting body 109 is foamed on directly and is movably connected to the film 150 or to the material protective layer 112. On the surface of the supporting body 109, facing away from the film 150, a material protective layer 112 is then stuck via layers 151 of adhesive 149, which are distributed over the surface of the supporting body 109 and spaced from each other, which material protective layer 112 forms the surface 107 of the seat cushion 106 facing the user.

The advantage of this layered structure and the connection of the individual layers with each other lies in that the manufacturing process can be simplified through the foaming on of the supporting body 109 onto the material protective layer 112, whereas the comfort of the seat cushion 106 when in use is not impaired, because the material protective layer 112, facing the user, is given a high degree of permeability by air, via attachment regions spaced from each other through the adhesive 149, in the region of the material protective layer 112, and therefore in the case of a compression of the supporting body 109 by the user leaning against the seat cushion 106, the air can escape and hence the elasticity of the supporting body 109 and of the material protective layer 112 can be utilized to the full. If, in fact, the further material protective layer 112 were formed by a foaming process on the supporting body 109, then the seat cushion 106 would act as an air balloon and would be felt as a hard body, whereby the sitting comfort of the seat cushion 106 is lost.

Any other desired combinations of the individual features previously described may form in each case individual solutions, independent in themselves, in accordance with the invention. Furthermore, it is pointed out that in the partially diagrammatic illustrations of the seat cushions according to the invention, the individual layers and plies were illustrated in a distorted and disproportionate manner with regard to scale, in order to illustrate the construction more clearly. Above all, the thread thicknesses of the individual weft- and warp threads 121 to 128, 130 to 134 and 136 to 141 were greatly exaggerated as regards scale and the individual threads were illustrated in a distorted manner with regard to their spacing in their position in longitudinal direction of the warp threads, for the purpose of better illustration.

What is claimed is:

1. In combination with an aircraft seat, a seat cushion comprising:
   (a) supporting body of foamed plastic material, the supporting body comprising
      (1) a major lower supporting part having lateral, front and rear edges, and a planar upper surface and a lower surface extending therebetween, and
      (2) a minor upper sitting part having an upper surface remote from the supporting part and a planar lower surface in contact with substantially the entire upper surface of the support part, the upper and lower surfaces of the sitting part extending between lateral edges of the sitting part,
   (b) a spring core formed of wires, the spring core being embedded in, and surrounded by, the foamed plastic material of the lower supporting part,
   (c) detachable connecting means for attaching the supporting and sitting parts to each other,
   (d) a flameproofing layer of a flame-retardant foamed plastic material covering at least the upper surface of the sitting part and overlapping the supporting part along the edges thereof, and
   (e) an outer covering material attached to the flameproofing layer.

2. The seat cushion of claim 1, wherein the covering material is detachably attached to the flameproofing layer.

3. The seat cushion of claim 1, wherein the detachable connecting means comprises burred closure means.

4. The seat cushion of claim 1, further comprising burred closure means detachably connecting the outer covering material to the supporting part.

5. The seat cushion of claim 1, further comprising burred closure means detachably connecting the flameproofing layer to the supporting part.

6. The seat cushion of claim 1, further comprising a flame-retardant material covering at least a surface portion of the supporting part not in contact with the sitting part.

7. The seat cushion of claim 6, wherein the flame-retardant covering material is elastically deformable.

8. The seat cushion of claim 6, wherein the flame-retardant covering material is bonded to the surface portion by an adhesive layer.

9. The seat cushion of claim 1, further comprising an intermediate layer arranged between the supporting body and the flameproofing layer, the intermediate layer being comprised of a high temperature resistant material selected from fibers and threads.

10. The seat cushion of claim 1, wherein the spring core in the supporting part is positioned further from the front edge than the rear edge of the supporting part.

11. The seat cushion of claim 1, wherein the spring core, when unstressed, has a height greater than that of the supporting part and is prestressed in the supporting part to a height less than that of the supporting part.

12. The seat cushion of claim 1, wherein the spring core has upper and lower bearing surfaces spaced, respectively, from and inwardly of the upper and lower surfaces of the supporting part.

13. The seat cushion of claim 12, wherein the spring core has intersecting longitudinal and transverse wires extending between the upper and lower bearing surfaces, and the lower surface of the supporting part defines grooves in alignment with the points of intersection of the wires.

14. The seat cushion of claim 1, wherein the lower surface of the sitting part defines recesses int he sitting part.

15. The seat cushion of claim 14, wherein the recesses are situated in the region of the lateral edges of the sitting part.

16. The seat cushion of claim 1, wherein the flameproofing layer covers the lateral edges of the sitting and supporting parts.

17. The seat cushion of claim 16, wherein the outer covering material extends over the lateral edges of the sitting and supporting parts, and the covering material is detachably secured to the lower surface of the supporting part.

18. The seat cushion of claim 1, wherein the supporting and sitting parts are made of open-celled foamed plastic materials of different densities, he density of the plastic material of the sitting part being less than that of the plastic material of the supporting part.

19. The seat cushion of claim 1, wherein the supporting part is comprised of a plurality of vertically extending regions of different foamed plastic materials.

20. The seat cushion of claim 1, wherein the flameproofing layer comprises an open-celled foamed plastic material having a density corresponding approximately to the density of the foamed plastic material of the sitting part.

21. The seat cushion of claim 1, wherein the flameproofing layer comprises an open-celled foamed plastic material having a density corresponding approximately to the density of the foamed plastic material of the supporting part.

22. The seat cushion of claim 1, further comprising a fluid-tight intermediate layer between the foamed plastic material of the supporting part and the covering layer.

* * * * *